(12) United States Patent
Burkhardt et al.

(10) Patent No.: US 9,897,463 B2
(45) Date of Patent: Feb. 20, 2018

(54) METHOD FOR OPERATING A SENSOR SYSTEM, SENSOR SYSTEM AND MEASUREMENT SIGNAL

(71) Applicant: BALLUFF GmbH, Neuhausen (DE)

(72) Inventors: Thomas Burkhardt, Zell unter Aichelberg (DE); Ralph Bauer, Kirchheim am Neckar (DE)

(73) Assignee: BALLUFF GmbH, Neuhausen (DE)

( * ) Notice: Subject to any disclaimer, the term of this patent is extended or adjusted under 35 U.S.C. 154(b) by 7 days.

(21) Appl. No.: 14/829,990

(22) Filed: Aug. 19, 2015

(65) Prior Publication Data
US 2016/0041004 A1 Feb. 11, 2016
US 2017/0003143 A9 Jan. 5, 2017

Related U.S. Application Data

(63) Continuation of application No. PCT/EP2014/054333, filed on Mar. 6, 2014.

(30) Foreign Application Priority Data

Mar. 8, 2013 (DE) .................. 10 2013 102 323

(51) Int. Cl.
*G01D 5/00* (2006.01)
*G01D 5/14* (2006.01)
(Continued)

(52) U.S. Cl.
CPC ............... *G01D 5/14* (2013.01); *G01D 3/00* (2013.01); *B60L 13/06* (2013.01); *B60L 2200/26* (2013.01);
(Continued)

(58) Field of Classification Search
CPC ....................................................... B60L 13/06
(Continued)

(56) References Cited

U.S. PATENT DOCUMENTS 6,452,512 B1 * 9/2002 Adkins .................. G01D 3/022
250/231.16
6,538,436 B1 * 3/2003 Simola ................... G01D 3/032
324/225
(Continued)

FOREIGN PATENT DOCUMENTS

CN 101080610 11/2007
CN 101305287 11/2008
(Continued)

OTHER PUBLICATIONS

Measurement Computing, Displacement and Position Sensing, May 2, 2016, 6 pages.*
(Continued)

*Primary Examiner* — Clayton E Laballe
*Assistant Examiner* — Kevin Butler
(74) *Attorney, Agent, or Firm* — Lipsitz & McAllister, LLC

(57) ABSTRACT

The invention proposes a method for operating a sensor system comprising at least one sensor unit which provides signals, in which the signals comprise primary measurement value signals which are measurement values of the sensor unit or are generated from measurement values of the sensor unit and in which the signals comprise coefficient signals which characterize the measurement value capture.

38 Claims, 5 Drawing Sheets

(51) Int. Cl.
*G01D 3/00* (2006.01)
*G01B 7/00* (2006.01)
*B60L 13/06* (2006.01)

(52) U.S. Cl.
CPC ............... *G01B 7/003* (2013.01); *G01D 5/00* (2013.01); *G01D 5/145* (2013.01)

(58) Field of Classification Search
USPC .................................................. 324/207.11
See application file for complete search history.

(56) References Cited

U.S. PATENT DOCUMENTS

| | | | |
|---|---|---|---|
| 6,553,336 B1* | 4/2003 | Johnson ................. | G01D 3/022 702/108 |
| 6,600,962 B1* | 7/2003 | Johnson ............. | G05B 19/4142 367/156 |
| 6,611,138 B2 | 8/2003 | Vasiloiu | |
| 6,867,581 B1* | 3/2005 | Bendicks ................ | G01P 21/02 324/207.13 |
| 6,906,512 B2 | 6/2005 | Ehling | |
| 7,173,414 B2 | 2/2007 | Ricks et al. | |
| 7,289,438 B2 | 10/2007 | Wastlhuber et al. | |
| 7,430,236 B2 | 9/2008 | Eberle et al. | |
| 7,705,492 B2 | 4/2010 | Pullmann et al. | |
| 7,750,743 B2 | 7/2010 | Ausserlechner et al. | |
| 9,046,392 B2 | 6/2015 | Wangler et al. | |
| 2002/0015389 A1* | 2/2002 | Wastlhuber .......... | G05B 19/042 370/282 |
| 2002/0017902 A1* | 2/2002 | Vasiloiu ............... | G01D 5/2046 324/207.17 |
| 2002/0131485 A1* | 9/2002 | Eberle ..................... | H04B 3/46 375/224 |
| 2003/0146747 A1* | 8/2003 | Ehling ................... | G01D 5/485 324/207.13 |
| 2006/0082363 A1* | 4/2006 | Ricks ..................... | G01D 3/022 324/207.21 |
| 2008/0157850 A1* | 7/2008 | Ausserlechner ......... | G01D 3/02 327/509 |
| 2008/0246344 A1* | 10/2008 | Pullmann ................ | G01D 3/08 307/326 |
| 2010/0097050 A1* | 4/2010 | Wangler ............... | G01D 11/245 324/207.13 |
| 2013/0181700 A1* | 7/2013 | Zern ...................... | G01B 7/023 324/207.17 |

FOREIGN PATENT DOCUMENTS

| | | | | |
|---|---|---|---|---|
| DE | 3131455 | 3/1983 | | |
| DE | 10113716 | 5/2003 | | |
| DE | 10164121 | 7/2003 | | |
| DE | 102004025387 | 12/2005 | | |
| DE | 102004025388 | 12/2005 | | |
| DE | 102005048601 | * 4/2007 | ............ | G05B 23/02 |
| DE | 102006051032 | 4/2008 | | |
| DE | 102006061721 | * 7/2008 | ............ | G01D 3/028 |
| DE | 202008014347 | 3/2009 | | |
| DE | 102008009250 | 10/2009 | | |
| DE | 102010039055 | 2/2012 | | |
| EP | 0982597 | * 3/2000 | ............ | G01R 33/025 |
| EP | 1164358 | 12/2001 | | |
| EP | 1168120 | 1/2002 | | |
| WO | 01/01366 | 1/2001 | | |

OTHER PUBLICATIONS

Christian Schott, Robert Raez, Fredy Betschart, Radivoje S. Popovic, Novel Magnetic Displacement Sensors, IEEE, 2002, 8 pages.*
Johnson, Robert, Smart Remote Monitoring System and Method WO01/01366, WIPO, Jan. 4, 2001, 54 pages.*
Jacob Fraden, 'Handbook of Modern Sensors Physics, Designs, and Applications 4th Edition', Springer, Apr. 2010, pp. 279-327.*
Thomas Burkhardt, Albert Feinaugle, Sorin Fericean, Alexander Forkl, "Balluff, Linear Displacement and Distance Sensors, Non-contact measuring system for industrial use", 2004, pp. 1-71.*
International Search Report for corresponding application PCT/EP2014/054333 dated May 14, 2014, 3 pages.*
Written Opinion International Search Authority for corresponding application PCT/EP2014/054333 dated May 14, 2014, 3 pages.*
Pavel Ripka, Alois Tipek, Instrumentation and Measurement Series Modern Sensors Handbook, ISTE Ltd, 2007, 62-68 pages.*
Thomas Burkhardt, Albert Feinäugle, Sorin Fericean, Alexander Forkl, "BALLUFF, Linear Displacement and Distance Sensors, Non-contact measuring systems for industrial use", 2004, pp. 1-71.
"EBU Time-and-Control Code for Television Tape-Recordings (625-Line Television Systems)", EBU Tech 3097-E, Third Edition, Apr. 1982, 34 pages.
BiSS Interface, Protocol Description (C-Mode), Rev C5, 2008, retrieved from the internet, <URL:http://www.ichaus.com>, retrieved on Nov. 10, 2015, 21 pages.
Wikipedia entry for "Profibus", retrieved from the Internet, <URL:https://en.wikipedia.org/wiki/Profibus>, retrieved on Nov. 10, 2015, 5 pages.
"SMPTE Made Simple", A Time Code Tutor by TimeLine, TimeLine Vista, Inc., San Marcos, CA, 1996, 46 pages.
German Search Report for corresponding application 10 2013 102 323.1 dated Apr. 30, 2013, 5 pages.

* cited by examiner

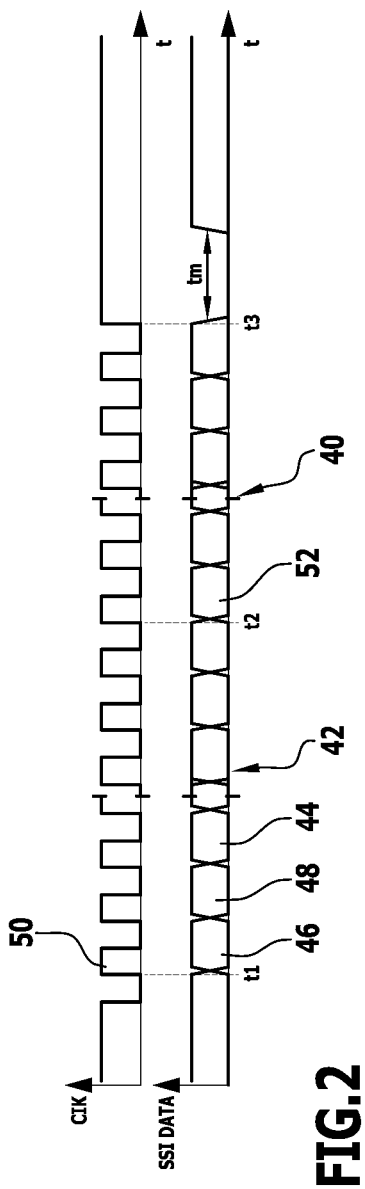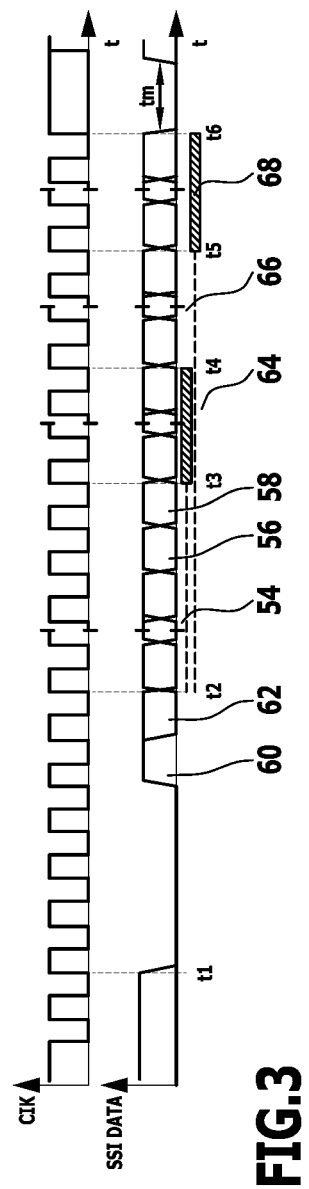

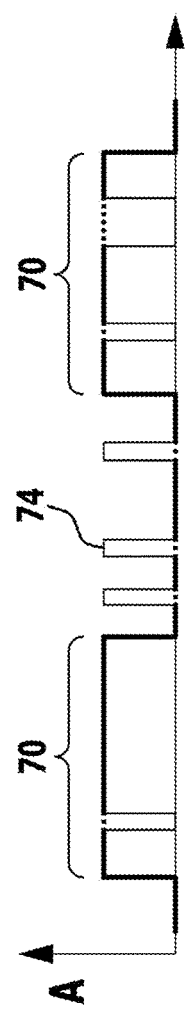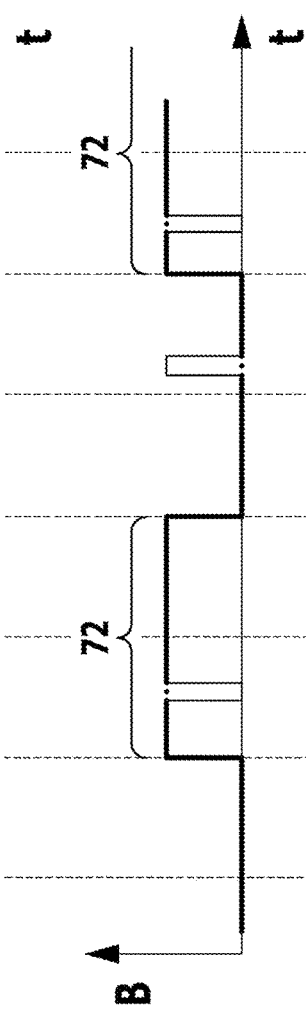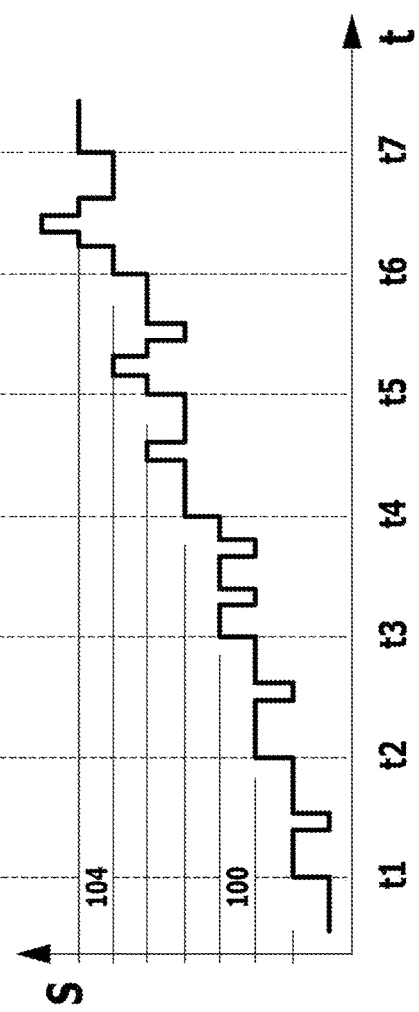

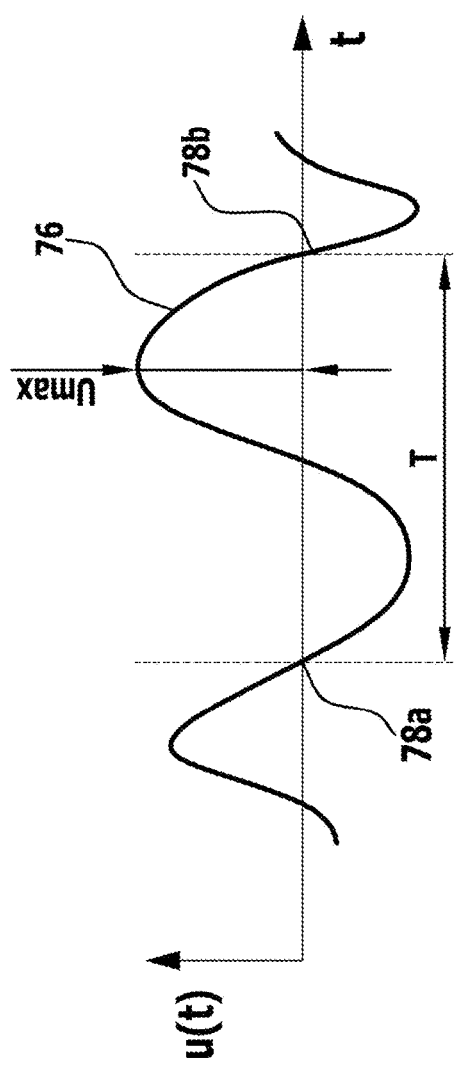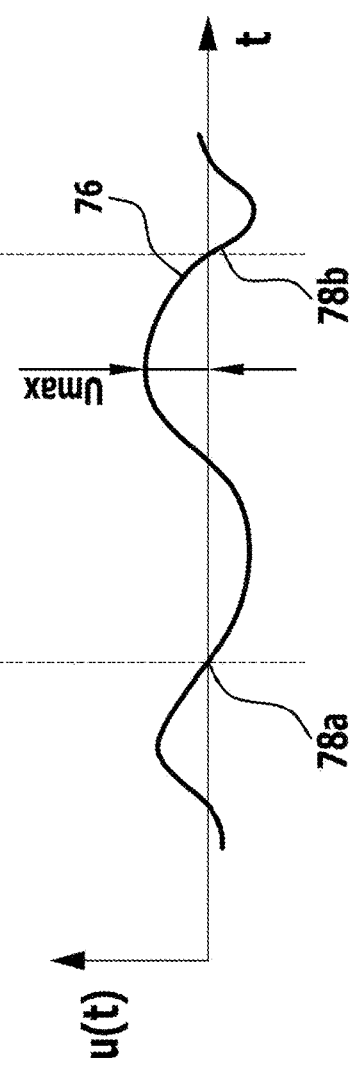

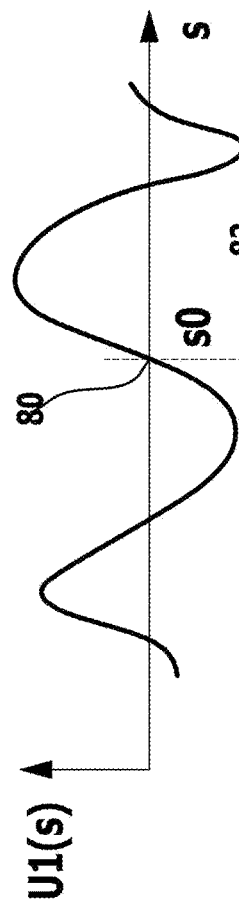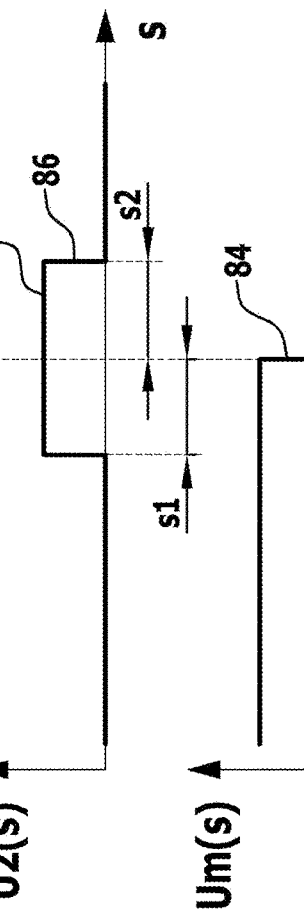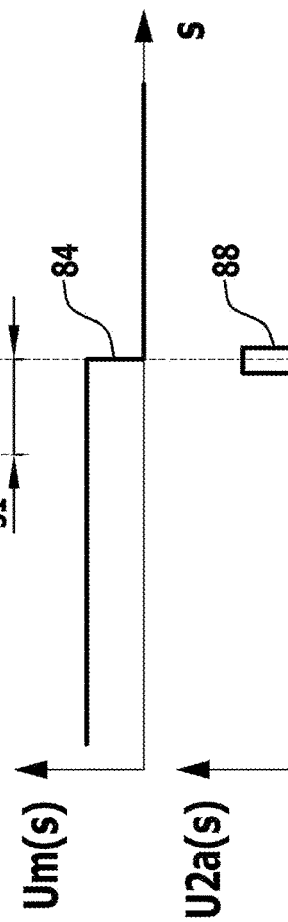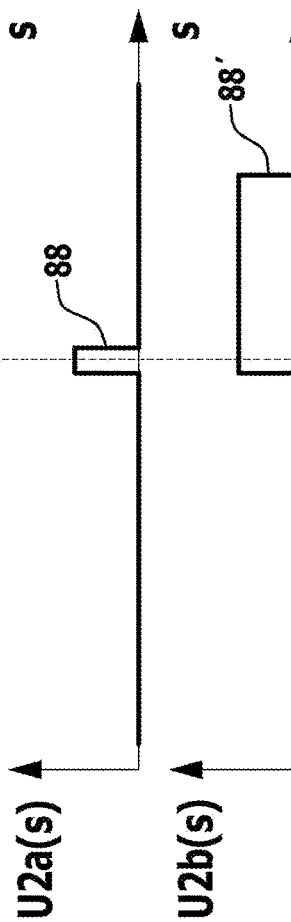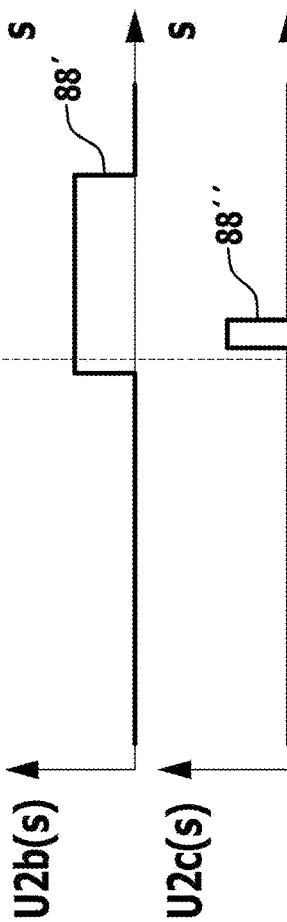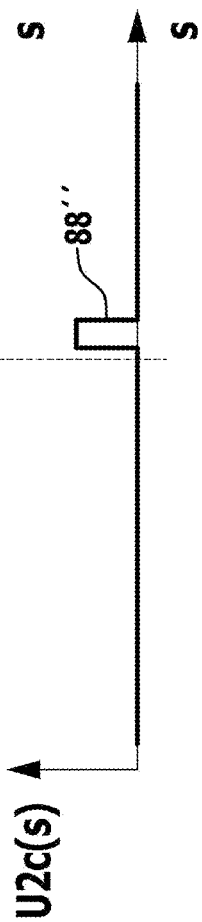

METHOD FOR OPERATING A SENSOR SYSTEM, SENSOR SYSTEM AND MEASUREMENT SIGNAL

This application is a continuation of international application number PCT/EP2014/054333 filed on Mar. 6, 2014 and claims the benefit of German application No. 10 2013 102 323.1 filed on Mar. 8, 2013, which are incorporated herein by reference in their entirety and for all purposes.

BACKGROUND OF THE INVENTION

The invention relates to a method for operating a sensor system comprising at least one sensor unit.

The invention further relates to a sensor system.

Furthermore, the invention relates to a measurement signal of a sensor system.

Sensor systems, such as inductive distance sensors, magnetostrictive displacement sensors and displacement sensors with magnetically encoded scale body, are described in the book "Lineare Weg- and Abstandssensoren" (Linear Displacement and Distance Sensors) by T. Burkhardt, A. Feinäugle, S. Fericean and A. Forkl, Verlag Moderne Industrie, Munich 2004.

DE 101 64 121 A1 discloses a magnetostrictive displacement measurement method for determining a position of a magnet, in which the magnet is movable along a waveguide, in which an excitation impulse is generated and is conducted through the waveguide to the magnet, in which a torsion wave is generated in the waveguide when the excitation impulse reaches the magnet, in which a reply impulse is generated depending on the torsion wave, and in which the position of the magnet is determined depending on the excitation impulse and the reply impulse. A multiplicity of positions and of excitation impulse correction values are associated with each other, and the duration of the next excitation impulse is changed depending on the position of the magnet determined and the associated excitation impulse correction value from the table.

DE 10 2004 025 388 A1 discloses a method for determining the position and/or one or more movement quantities of an object, in which position data and/or first movement data for a first movement quantity of the object are determined by time-discrete measurements and in which second movement data for a second movement quantity of the object are determined by time-continuous measurements, wherein the second movement quantity is in a differential relation with respect to the position and/or the first movement quantity.

DE 31 31 455 A1 discloses a magnetostrictive displacement measuring device comprising an impulse generator for generating electric impulses. There is provided a source for generating sound impulses which serve as reference impulses, said source being stationary with respect to a sound transducer and cooperating with a magnetostrictive element.

DE 10 2006 051 032 A1 discloses a system for determining the anchoring state of implanted endoprostheses, wherein the endoprosthesis has arranged thereon a sensor suited to vibration measurement and a transponder unit for wireless transmission of vibration measurement signals and for inductive transmission of electrical energy.

A magnetostrictive sensor and a control apparatus for controlling a variable of a device are disclosed in U.S. Pat. No. 6,600,962 B1.

DE 101 13 716 C2 discloses a communication interface for a distance measuring device, said communication interface being capable of being coupled between the distance measuring device and a control device.

U.S. Pat. No. 6,867,581 B1 discloses a sensor device comprising a sensor element for generating an output signal in response to the measurement of a physical quantity.

DE 20 2008 014 347 U1 discloses a displacement measuring apparatus, comprising a measuring probe, a housing, a first board, a second board and a third board, said boards being arranged in the housing and being circuit carriers, wherein the second board and the third board are in each case oriented transversely to the first board, wherein the second board and the third board are connected together by means of a first connector device and wherein the combination of second board and third board is connected to the first board by way of a second connector device.

DE 10 2008 009 250 B4 discloses a distance sensor apparatus in which distance determination relies on a propagation time measurement of signals, said apparatus comprising a transmitter device, a receiver device providing receive signals, an amplifier device for receive signals, a control device operatively connected for signal communication with the amplifier device and controlling the latter by control signals in order to control the amplitude of amplified receive signals. A control signal evaluation device is provided which is operatively coupled for signal communication with the control device and which is provided with control signals for evaluation. The control circuit comprises a terminal via which control signals can be coupled out and can be provided to the control signal evaluation device.

DE 10 2004 025 387 A1 discloses a magnetostrictive displacement transducer for detecting the displacement of a position marker, said magnetostrictive displacement transducer comprising a measuring probe device having a measuring probe extending in a longitudinal direction, the position marker coupling to the measuring probe in a non-contact manner. An integrated acceleration sensor is provided for determining the acceleration of the position marker.

DE 10 2010 039 055 A1 discloses a displacement measuring apparatus, comprising at least a first measuring path and a second measuring path, each of these having an extension in a longitudinal direction and being oriented parallel to one another in at least a measuring range. Furthermore, at least one position marker is provided which couples to the measuring paths in a non-contact manner and a measuring path holder is provided which extends in the measuring range and has recesses, each recess having a measuring path arranged therein.

EP 1 164 358 A1 discloses an inductive measuring device for position detection, consisting of a coil structure and a scale body with at least one scale of variable reluctance or conductivity. The coil structure is of multilayer design comprising a combination of coils having contours in the form of quasi-closed windings.

A method for serial data transmission between a position measuring system and a processing unit is known from EP 1 168 120 A2.

A description of essential aspects of the PROFIBUS technology is provided in "PROFIBUS Technology and Application" System Description, August 2002-version.

A description of a format and a modulation method for a digital code recorded on a longitudinal track is provided in the document entitled "EBU Time-And-Control Code for TELEVISION TAPE RECORDINGS", Tech 3097-E, 3rd edition, April 1982, said digital code being used for purposes of timing and control on television tape machines and associated audio tape machines.

A description of the Open Source BiSS Interface is provided in the article entitled "BiSS-Interface als adaptierter Interbus" SPS-Magazin, HMI-Special issue, 2011, pp. 113-115.

A description of the SMPTE time code is provided in the document entitled "SMPTE Made Simple", TimeLine Vista, Inc., 1996.

SUMMARY OF THE INVENTION

In accordance with an embodiment of the invention, there is provided a method for operating a sensor system comprising at least one sensor unit which provides signals, said method having a high utilization factor for a user.

In accordance with an embodiment of the invention, the signals comprise primary measurement value signals which are measurement values of the sensor unit and are generated from measurement values of the sensor unit, and coefficient signals which characterize the measurement value capture.

The primary measurement value signals characterize the physical quantities that are measured via the at least one sensor unit. The coefficient signals characterize how "critical" the determination of these measurement quantities was in terms of, for example, how much "margin" or "security" existed in the measurement thereof.

The coefficient signals provide qualitative and quantitative information on the reliability of the measurement values. Optionally, the sensor system may be adjusted by, for example, a feedback loop in order to achieve a higher quality.

In particular, the primary measurement value signals are electrical signals which are measurement values of, or are generated from, one or more physical quantities.

The coefficients which are contained in the coefficient signals characterize in particular what margin and/or security and/or quality exist(s) in the capture of the measurement values, or how critical the determination thereof is. For example, measurement values may be captured at different signal-to-noise ratios. The signal-to-noise ratio can be characterized via the coefficients. If, for example, this ratio is very small, the captured measurement values are correspondingly more "critical".

For example, by determining the coefficient and in particular by determining the coefficient on a regular basis, it is also possible, when changes occur in the sensor system or in the environment of the sensor system which change relevant properties, for such changes to be recognized at an early stage, and corresponding actions can then be initiated.

By way of example, it is also possible that for "bad" coefficients an indication be given indicating, for example, the need for a sensor system to be readjusted.

The primary measurement value signals and the coefficient signals can be transmitted on different channels.

Alternatively, it is also possible for the measurement value signals and the coefficient signals to be transmitted in attached relationship with each other and in particular to be transmitted on a single channel. By way of example, coefficient signals can be modulated onto the primary measurement value signals or they can be serially attached thereto.

In particular, the primary measurement value signals and the coefficient signals are combined in the output signals in such a manner that downward compatibility with the method of "pure" transmission of measurement values (i.e. without coefficients) exists so that, for example, an adjustment can be made in a superordinate control or controller as to whether or not the coefficient signals are utilized.

It is possible for the coefficient signals to be permanently transmitted and in particular to be transmitted at the same data rates as that of the primary measurement value signals. For example, monitoring on a regular basis can thereby be realized.

It is also possible for the coefficient signals to be transmitted at a data rate that is less than that of the measurement value signals and, in particular, for them to be transmitted at certain events, such as startup or shutdown of the sensor system or service calls related to the sensor system. A corresponding checking action can thereby be realized.

In an exemplary embodiment, the coefficient signals and the primary measurement value signals are transmitted in analog form and, in particular, the coefficient signals are modulated onto the primary measurement value signals.

It is also possible for the primary measurement value signals and the coefficient signals to be transmitted in serial digital form. For example, downward compatibility can thereby be achieved in a simple way. In particular, the coefficient signals are attached to the primary measurement value signals in time sequence.

In an exemplary embodiment, a primary measurement value signal is transmitted as a digital datum comprising a plurality of data bits, in particular wherein the individual data bits are requested and output with respective clock impulses. A coefficient signal can thereby be attached as a digital datum in a simple way.

In particular, provision is made for a number of the data bits requested and output to be defined by clock impulses of a controller. Downward compatibility can thereby be realized in a simple way, i.e. a controller is able to decide by, for example, the number of clock impulses whether it wants to receive or evaluate the additional information that is contained in the coefficient signals. Signal chains comprising coefficient signals can then be generated, and a selection can be made via the controller as to whether or not the coefficient signals are evaluated.

In particular, then, a coefficient signal is attached to the datum of the associated primary measurement value signal as a digital datum comprising data bits and is in particular attached to said datum in such a manner that it follows the latter in time. This results in a total signal that comprises as its components the datum of the primary measurement value signal and the datum of the coefficient signal. For example, a superordinate controller can then decide via a corresponding clocking action whether the coefficient signals are evaluated as well or whether they are ignored.

A number of associated clock periods of the primary measurement value signal with n data bits with attached coefficient signal with m data bits is n+m. A superordinate controller can then decide by a corresponding clocking action with n clock periods whether the primary measurement value signal alone is used, or, by selecting n+m periods, whether the coefficient signal is utilized as well. Furthermore, by way of a corresponding clocking action in a superordinate controller, it is easily possible for the primary measurement value signal to be separated from the coefficient signal.

Provision may be made for the datum of the measurement value signal and/or the datum of the coefficient signal to contain one or more extra bits in addition to the actual measurement value information and coefficient information and in particular to comprise one or more error bits and/or warning bits and/or check bits or also start bits.

A measurement value signal datum can be provided with CRC bits and CRC bits are then attached to the coefficient signal datum as well. CRC bits provide a check value in order to be able to detect errors in transmission or storage. Downward compatibility results when corresponding CRC bits are attached to a datum which consists of the original datum, the CRC for the latter, and the coefficient signal datum. The total signal therefore ends with CRC bits. This "end" CRC is determined using the same algorithm as that used for determining the CRC for the original datum.

In particular, a number of the clock periods for measurement value signals with n data bits with attached coefficient signal with m data bits and with q data bits for a CRC datum is then n+m+2q. Because the CRC datum is contained twice in the total signal, it accordingly requires 2 q clock periods.

In particular, the CRC datum of a signal chain comprising a measurement value signal and a coefficient signal is protected by the CRC datum that is attached to the coefficient signal. This results in a high level of security and compatibility because, as with the transmission without coefficient datum, the CRC bits are attached to the end of the total signal.

For example, the primary measurement value signals and the coefficient signals are transmitted according to SSI interface (SSI protocol) or BiSS-C interface (BiSS-C protocol). The transmission of coefficient signals can be integrated in these protocols in a corresponding manner.

It is also possible for primary measurement value signals to be transmitted as analog or digital increments. Such a transmission of increments is provided for example in displacement measuring systems using a magnetically encoded scale body. Coefficient signals can thereby be transmitted by corresponding (additional) increments.

For example, coefficient signals are transmitted as increments with a time distance apart that is less than the time distance between increments of the primary measurement value signals. By arrangement and/or frequency of increments which form the coefficient signal, the corresponding coefficient signal can be transmitted. For a superordinate (evaluating) controller, a coefficient signal when not evaluated specifically means, at most, increased noise.

In particular, transmission of the coefficient signals is such that a superordinate controller can decide whether or not it evaluates the coefficient signals. This results in downward compatibility. For example, a decision as to whether or not coefficient signals are evaluated can be made via the number of clock periods used.

It is particularly advantageous for a signal chain comprising primary measurement value signals and coefficient signals to be formed such that there is provided a capability of selecting whether or not coefficients are read out. This results in downward compatibility. In a serial digital transmission for example, a decision as to whether it is desired to read out coefficients is made by sending more clock impulses.

In a BiSS-C transmission for example, if no more clock impulses are sent after a first CRC, the system will behave like a standard BiSS-C interface. Downward compatibility is thereby realized in a simple way; if further clock impulses are sent, one obtains the coefficient and the CRC across the entire data set. For example, incremental interfaces have additional impulses inserted therein which, by a standard controller, are interpreted merely as noise. These additional impulses can be evaluated and interpreted and coefficients can be captured therefrom. For example, in an analog data transmission, the coefficient is superimposed on the useful signal. A standard controller can ignore the coefficient signals. An adapted controller can look out for the superimposed coefficient signals and can evaluate and interpret these in a corresponding manner.

It is particularly advantageous for coefficient signals to be determined at the sensor system without the use of additional monitoring sensors and, in particular, for one or more sensors of the at least one sensor unit to be used for the determination of coefficients. Coefficient determination can thereby be realized in a simple way.

In an exemplary embodiment of a sensor system, the time period between certain two zero-crossings of an analog signal is measured as a primary measurement value signal. A maximum signal level between the zero-crossings then advantageously results in the coefficient directly or indirectly.

Such a determination is for example provided in magnetostrictive displacement measurements. For example, when the maximum signal level is very low, then a bad signal-to-noise ratio exists and the determination of the time period is "critical", i.e., in particular, there is not a high level of measurement accuracy.

Provision may also be made for measurement values to be captured from a plurality of signals of the at least one sensor unit. For example, by combining corresponding signals, coefficients can then be determined as well.

For example, a check is performed as to whether on a certain zero-crossing of an analog first sensor signal, a digital second signal is in high state, and if this the case a measurement signal is generated, in particular as a falling edge of a digital signal. Such a capture of a primary measurement value signal is used for example in connection with sensor systems that employ magnetically encoded scale bodies.

For example, a coefficient signal is then generated from the length of the second sensor signal at HIGH and the latter's position relative to the zero-crossing. In a sense, the phase between the digital second sensor signal and the analog first sensor signal is checked.

In a magnetostrictive displacement measuring system for example, a position value is derived from a voltage signal and an amplitude of the voltage signal forms a coefficient signal, in particular wherein the amplitude is determined via the adjustment of an automatic gain control circuitry. For example, a coefficient signal can then be directly generated from this adjustment.

In a magnetically encoded displacement measuring system for example, a coefficient signal is determined from an amplitude or amplitude ratio and/or a phase or phase ratio of magnetic sensor signals.

It is particularly advantageous if, in a sensor system comprising a plurality of sensor units, the measurement value of the sensor unit that has the highest coefficient is used. For example, it is then possible, in a redundant sensor system, to determine which measurement value has the highest "security", and this measurement value can then be used.

In accordance with an embodiment of the invention, a sensor system is provided, said sensor system comprising at least one sensor unit which provides measurement values for primary measurement value signals and comprising a coefficient determining unit which generates coefficient signals that characterize the measurement value capture.

The sensor system constructed in accordance with the invention has the advantages that have already been discussed in connection with the method in accordance with the invention.

In particular, the method in accordance with the invention can be carried out on a sensor system constructed in accordance with the invention.

Further advantageous embodiments of the sensor system constructed in accordance with the invention have likewise already been discussed in connection with the method in accordance with the invention.

In particular, a signal generating unit is provided which connects coefficient signals to primary measurement value signals. It is thereby possible for coefficient signals to be transmitted in associated relationship with the measurement value signals.

In particular, the coefficient determining unit generates the coefficient signals without the use of additional monitoring sensors.

In accordance with an embodiment of the invention, there is further provided a measurement signal comprising a primary measurement value signal and a coefficient signal which characterizes the measurement value capture.

For example, the coefficient signal is attached to the primary measurement value signal in time sequence, in particular wherein the primary measurement value signal is transmitted in serial form, and a serial total signal is formed. In the case of analog signals it is also possible, for example, to modulate the coefficient signal onto the primary measurement value signal.

The measurement signal in accordance with the invention has the advantages that have already been explained in connection with the method in accordance with the invention and the sensor system in accordance with the invention.

In particular, the primary measurement value signal is a digital serial signal and the coefficient signal is attached (in serial form) as a digital datum to the primary measurement value signal.

The following description of preferred embodiments serves in conjunction with the drawings to explain the invention in greater detail.

BRIEF DESCRIPTION OF THE DRAWINGS

FIG. 2 is an exemplary embodiment of a serial signal comprising a measurement value signal and a coefficient signal attached thereto;

FIG. 3 is an exemplary embodiment of a CRC-protected signal with an attached coefficient signal;

FIGS. 4(a), (b) are examples of incremental measurement value signals with coefficient signals;

FIG. 4(c) is an example of a stepped course wherein position signals from a position marker are transmitted as positive or negative increments;

FIGS. 5(a), (b) are examples of a measurement quantity for different conditions of Umax (FIGS. 5(a) and (b));

FIGS. 6(a), (b) show measurement quantities from which are derived measurement value signals (FIG. 6(c)) and different "critical signals" (FIGS. 6(d), (e), (f)) which are used for coefficient determination.

DETAILED DESCRIPTION OF THE INVENTION

Figure 1:
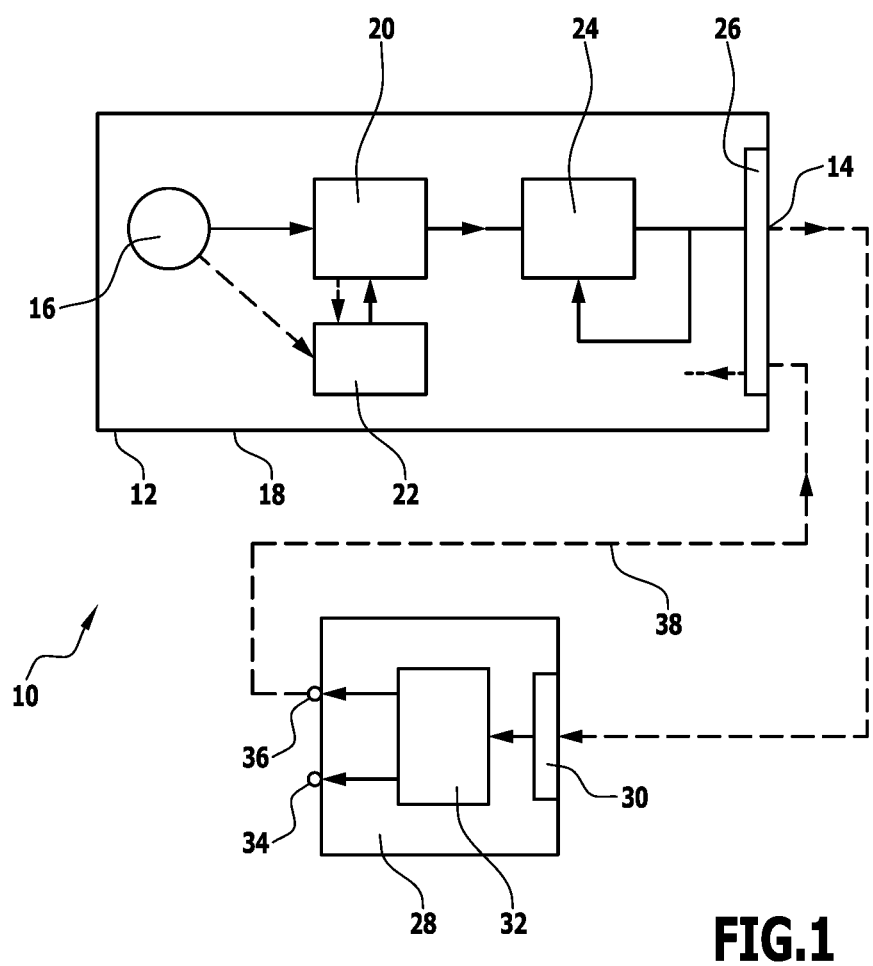
FIG. 1 is a schematic representation of a sensor system that provides coefficient signals, comprising a control device of a superordinate control.

An exemplary embodiment of a sensor system, shown schematically in FIG. 1 and indicated therein by 10, comprises a sensor device 12. Said sensor device 12 provides sensor signals at an output 14 thereof. The sensor device 12 comprises a sensor unit 16. In particular, said sensor unit 16 is arranged within a housing 18. The housing 18 is preferably closed.

The sensor unit 16, which comprises one or more sensitive elements, measures physical quantities. These form the actual measurement values. The measurement values are converted to electrical quantities by a transducer unit 20 if they are not electrical quantities already.

The sensor device 12 further comprises a coefficient determining unit 22. The coefficient determining unit 22 determines a coefficient which is associated with one or more measurement values and characterizes the security and/or quality of the measurement value capture itself. In particular, a coefficient characterizes a margin or security that exists in the measurement value capture.

In particular, the coefficient determining unit 22 is configured such that an additional monitoring sensor is not required for coefficient determination.

For example, the coefficient determining unit 22 itself captures measurement signals of the sensor unit 16 and/or captures data that are provided by the transducer unit 20.

Measurement value signals and coefficient signals are combined.

The sensor device 12 comprises for example an amplifier 24 which amplifies the measurement value signals, thereby providing primary measurement value signals which are usable signals. In an exemplary embodiment, the combination of primary measurement value signals and coefficient signals is amplified.

It is also possible in principle for coefficient signals and primary measurement value signals to be amplified separately.

The sensor device 12 has an interface 26. This interface 26 is connected to the output 14. Primary measurement value signals and associated coefficient signals are provided at the output 14 in a single-channel manner or in a multichannel manner.

In an exemplary embodiment, the sensor system 10 comprises a superordinate control device 28. The control device captures the signals of the sensor device 12 which are composed of the primary measurement value signals and the coefficient signals and are provided at the output 14. To this end, the control device 28 has an adapted interface 30. Downstream of this interface 30 is an evaluation unit 32. In particular, the evaluation unit 32 separates the primary measurement value signals from the coefficient signals. For this purpose, there are provided for example a first terminal 34 and a second terminal 36. Primary measurement value signals are provided, or utilized, at the first terminal 34 via a corresponding interface and coefficient signals are provided at the second terminal 36 via a corresponding interface.

It is alternatively possible for the separation between measurement value and coefficient to be realized not in a separate control device but within the control entity.

It is in principle possible for a feedback to exist between the control device 28 and the sensor device 12. This feedback is indicated in FIG. 1 by the line designated by reference character 38. The line 38, which is connected to the second terminal 36, feeds back coefficient signals to the sensor device 12, in particular over the interface 26. A corresponding adaptation depending on the coefficient signals can be carried out in the sensor device 12, for example by correspondingly adjusting the sensor unit 16 and/or the transducer unit 20 and/or the amplifier 24. By way of example, it is thereby possible to realize some type of control loop in order to achieve a high-quality measurement result. The objective of this feedback may be, for example, to achieve a high coefficient in the measurement value capture.

It is also possible for coefficient signals to be used for adaptation in the sensor device 12 directly (without external outcoupling).

In an exemplary embodiment (FIG. 2), the sensor device 12 provides a signal in which a coefficient signal 40 is attached to a primary measurement value signal. Said signal is transmitted as a digital serial transmission, which is single-channel.

The primary measurement value signal 42 is a digital datum composed of a plurality of data bits. The data bits comprise measurement value data bits 44 from MSB (most significant bit) to LSB (least significant bit). Furthermore, extra bits are provided, such as one or more error bits 46 and one or more warning bits 48. The datum of the primary measurement value signal 42 is transmitted between time t1 and time t2 and comprises n data bits, inclusive of any extra bits such as error bits 46 and warning bits 48.

Each individual data bit is output on a respective clock impulse 50 and is output, for example, with a rising edge of such clock impulse. There are therefore provided n clock periods for n data bits of the datum of the primary measurement value signal 42.

The coefficient signal 40 is a datum having m data bits 52 between the data bits MSB (most significant bit) and LSB (least significant bit). These data bits 52 of the coefficient signal 40 are transmitted between times t2 to t3. The datum of the coefficient signal 40 follows the datum of the primary measuring signal 42 immediately.

The data bits 52 of the coefficient signal 40 are output on corresponding clock impulses 50. There are therefore provided m additional clock impulses for transmitting the coefficient signal 40; the total signal, which is composed of the primary measurement value signal 42 and the attached coefficient signal 40, comprises n+m data bits. N+m clock periods 50 are needed for it.

The total signal is transmitted between times t1 and t3. Time t3 is followed by a pause of duration tm.

In the example illustrated, transmission is in accordance with SSI protocol in particular.

The data transmission of the signal comprising the primary measurement value signal 42 and the attached coefficient signal 40 has "downward compatibility". The superordinate control device 28 can decide whether or not it evaluates the coefficient signals 40; if, upon reception, only n clock impulses 50, counting from start, are evaluated, then it is the primary measurement value signal 42 alone, without attached coefficient signal 40, which is being evaluated. If n+m clock impulses are used in the reception, then the coefficient signal 40 can be evaluated as well.

In a second exemplary embodiment (FIG. 3), the signals are likewise transmitted in serial digital form, but this signal transmission is via BiSS-C protocol. The primary measurement value is transmitted as a digital datum 54 from time t2 on. This digital datum 54 comprises, after the actual measurement value data bits from MSB to LSB, at its end, an error bit 56 and a warning bit 58. This digital datum comprises n data bits. Transmission at time instant t2 starts after a start bit 60 and a CDS (Control Data Slave) 62.

The datum 54, which is or contains the primary measurement value signal, is followed by a CRC datum 64 having q bits. The CRC (Cyclic Redundancy Check) contains a check value for the data; these are the data of the primary measurement value signal.

The CRC 64 is transmitted between time instants t3 and t4. With time instant t4, the transmission could be completed; it is then a "normal" BiSS-C transmission. From time instant t4, if further clock impulses are transmitted, a datum 66 for the coefficient signal is attached to the datum 54 having the CRC 64. Said datum 66 comprises m bits and is transmitted between time instants t4 and t5. The datum 66 in turn has a CRC 68 attached thereto directly, this being transmitted between time instants t5 and t6. The CRC 68 corresponds to the CRC 64, but now covering all the bits between time instants t2 and t5. Contained in this space of time are data bits, error bits, warning bits, the original CRC (over t2 to t3) and coefficient bits. The total signal therefore ends with the CRC 68.

A superordinate control, comprising for example a control device 28, can then read out the total signal's CRC at the end of the total signal in the same way as in the case of no coefficient signals being attached. This results in downward compatibility.

The total signal is transmitted in n+m+2q clock periods when the start bit 60 and the CDS 62 are not taken into consideration.

In a further exemplary embodiment (FIG. 4), signals are transmitted in digital incremental form. This is explained with respect to an example in which a signal marker moves in a positive direction at a constant velocity. The sensor unit provides signals A (FIG. 4(a)) and B (FIG. 4(b)). The "main signals" are impulses 70 and 72, respectively. Position signals from a position marker are transmitted as positive or negative increments. For example, in an instance in which edges of a signal 70 occur before edges of a signal 72, this will be counted as a positive increment. The reverse instance will be counted as a negative increment. This results in a basic stepped course (for movement in positive direction at constant velocity) as depicted in FIG. 4(c).

Coefficient signals 74 can now be superimposed as increments as well, wherein a length (in time) of an increment 74 of a coefficient signal is less than a length in time of a main signal 70 or 72.

The sequence of edges 74 then results in the total coefficient signal.

In FIG. 4, the signal 70 (A signal) and the signal 72 (B signal) each have a corresponding short increment superimposed thereon between time instants t1 and t3. The evaluation in the case of the A signals and B signals results in a short negative increment followed by a positive increment. The main signals 70, 72 have a negative increment superimposed thereon. Between time instants t3 and t4, where the signal 70 is at LOW, negative and positive increments are superimposed two times.

By the frequency and/or the succession of positive and negative "short" edges 74, which are evaluated as increments, the coefficient can be encoded, i.e. a coefficient signal can be generated.

In a position measurement, this means that the incremental main signals 70, 72 remain unchanged. The main signals have inserted therein short increments as short changes in position. By way of example, the coefficient can be encoded with the frequency or the amplitude of these short changes in position. For a standard controller without coefficient evaluation, these short changes in position manifest themselves like position noise.

There are other possibilities of coefficient transmission.

For example, the primary measurement value signal and its associated coefficient signal can be transmitted in analog form over (at least) two channels.

Also, provision may be made for the primary measurement value signal and the associated coefficient signal to be transmitted in analog form on one channel. For example, the coefficient signal is modulated on the primary measurement value signal by, for example, amplitude modulation.

It is for example also possible for primary measurement value signals and coefficient signals to be transmitted in incremental analog form. For example, one exemplary embodiment transmits position signals as four sinusoidal and cosinusoidal voltages as differential signals.

$$U_{+sin}(s) = Usi_{max} * \sin(ws) + U_{si0} \quad (1)$$

$$U_{-sin}(s) = -Usi_{max} * \sin(ws) + U_{si0} \quad (2)$$

$$U_{+cos}(s) = Uco_{max} * \cos(ws) + U_{co0} \quad (3)$$

$$U_{-cos}(s) = -Uco_{max} * \cos(ws) + U_{co0} \quad (4)$$

Here, s is the displacement to be measured and w is determined by $$w = \frac{2\pi}{L} \quad (5)$$

L is a pole length or pole pair length in, for example, a pole sensitive sensor system.

$Usi_{max}$ and $Uco_{max}$ are voltage amplitudes. It is advantageous for these to be as large as possible. Furthermore, the signals contain direct voltage components $U_{si0}$ and $U_{co0}$.

Generally, there are tolerances for the aforesaid quantities that are accepted by standard controllers. By exploiting these tolerances, the coefficient can be encoded during transmission. For example, the dc components $U_{si0}$ and $U_{co0}$ can transmit a coefficient x between for example x=0 and x=1:

$$U_{si0}(x) = U_{si0\_100} + (1-x) * \text{hub} \quad (6)$$

$$U_{co0}(x) = U_{co\_100} - (1-x) * \text{hub} \quad (7)$$

where hub is half the maximum offset difference that a superordinate control, such as the control device 28, still tolerates.

For example, the greater the difference between the dc components, the more critical the signal capture is. Referring to the above example, when the coefficient is no greater than x=1, then the dc component is the same for both signal pairs.

For example, in a variant form, it is also possible for the difference between the dc components $U_{si0}$ and $U_{co0}$ to be modulated at a certain frequency that is proportional to the coefficient.

It is also possible for the two dc components to be varied at the same frequency but at different relative phases. For example, if the dc components then change in-phase relative to each other, the primary measurement value signal having the maximum coefficient was determined. A minimum coefficient results for a 180° phase difference, for example.

This method is also downward compatible with a standard sine/cosine interface.

It is possible in principle for coefficient signals to be permanently transmitted with primary measurement value signals. The data rate of the coefficient signals then corresponds to that of the primary measurement value signals.

In one embodiment, provision is made for the primary measurement value signals to be transmitted at a data rate that is higher than that of the coefficient signals. For example, coefficient signals are transmitted only at certain events, such as for example, the startup of the sensor system, the shutdown of the sensor system, service calls related to the sensor system, etc.

The coefficients contained in the coefficient signals characterize in particular a security or margin and therefore also a quality of a measurement value that is contained in the measurement value signal. They thereby characterize how "critical" the determination of the measurement value was.

Such information may for example be utilized where a plurality of sensor units 16 exist in order to use, for evaluation or use, only the primary measurement value signals of the sensor unit that has the highest coefficient. For example, in a redundant system comprising a plurality of sensor devices or a plurality of sensor units (in one sensor device), the "best" measurement can thereby be used.

The coefficient associated with the primary measurement value signal is a measure of the "quality" of the measurement. In principle, the primary measurement value signals can be monitored, via the coefficient, for their "usability" in terms of the measurement values contained therein. For example, if the coefficient falls below a threshold, a warning signal can be emitted indicating that the measurement values fall below a lower limit of reliability.

The coefficient signals can be captured in different ways in different sensor systems. The way they are captured depends on the measurement value capture.

In one exemplary embodiment (FIG. 5), a measurement value signal is captured from an analog signal 76 which has zero-crossings by determining a distance T (for example a distance in time) between certain two zero-crossings 78*a* and 78*b*. The useful signal (the analog signal 76) has a certain maximum signal level Umax between the two zero-crossings 78*a*, 78*b*. This maximum is a measure of the "security" of the measurement and can be used as a coefficient. For example, the smaller Umax is, the worse the signal-to-noise ratio and the more critical the measurement of T (for example a measurement of time) will be. The larger Umax, the more secure the time measurement T is. For example, when Umax becomes smaller and disappears in the noise, time measurement is no longer possible.

Umax can therefore be used as a coefficient directly, and the corresponding coefficient signal can be generated therefrom by the coefficient determining unit 22.

In another exemplary embodiment (FIG. 6), measurement value recognition comprises a plurality of sensor signals U1(s) and U2(s) (FIGS. 6(*a*) and (*b*)). The usable signal U1(s) is an analog signal and the usable signal U2(s) is a digital signal.

Measurement value recognition or capture takes place, for example, when the usable signal U1(s) has a rising zero-crossing 80, while at the same time the usable signal U2(s) is in high state 82. A resultant primary measurement value signal Um(s) is then generated (FIG. 6(*c*)), said signal having a falling edge 84.

Here, in principle, the quality of the primary measurement value signal Um(s) is defined by the locations s1 and s2 of the signal 86, which is in high state 82.

It is desirable for s1 and s2 to be as large as possible and for their values to be as similar as possible. However, they must not be so large that they coincide with further rising edges of U1(s).

FIGS. 6(*d*), (*e*) and (*f*) show different cases for U2(s). These signals do not correspond to the situation shown in FIGS. 6(*a*) and (*b*). The signal U2*a*(s) in accordance with FIG. 6(*d*) and the signal U2*b*(s) in accordance with FIG. 6(*e*) show cases where the resultant signal Um(s) is only just valid. The signal U2*c*(s) in accordance with FIG. 6(*f*) comes "too late" and Um(s) is not output correctly any longer.

The aforementioned signals U2(s) as well as U2*a*(s), U2*b*(s) and U2*c*(s) are examples of how a coefficient can be determined. These signals do not themselves transmit the coefficient. The coefficient can be transmitted in serial form, in digital incremental form, in analog incremental form, etc. depending on the interface used.

A concrete exemplary embodiment of a sensor system is a magnetostrictive displacement measuring system. See, for example, T. Burkhardt, A. Feinäugle, S. Fericean, A. Forkl, "Lineare Weg-und Abstandssensoren" ("Linear Displacement and Distance Sensors"), Verlag Moderne Industrie, Munich 2004. Magnetostrictive distance measuring systems operate on the principle of measuring the propagation time of a torsional wave that is generated by making use of an inverse magnetostrictive effect. The position marker is a magnet. A position value for the position of the magnet is derived from a voltage signal. The amplitude of the voltage signal changes under the effect of different influencing quantities, such as temperature, distance of the position marker from a waveguide, lateral offset of the position marker with respect to the waveguide, position, etc. Correction for such influencing quantities is for example realized by an automatic gain control (AGC) circuit, in particular wherein adaptive control techniques are applied. For example, the coefficient can be generated from the amplitude of the voltage signal. A relevant value can in turn be determined by, for example, adjusting the gain of the automatic gain control circuitry. In particular, the primary measurement values are captured from the voltage signals as described above with reference to FIG. 5, while Umax is determined via the adjustment of the automatic gain control circuit.

In a magnetically encoded sensor system (displacement sensor with magnetically encoded scale body), in order to capture displacement information, a sensor head comprising magnetic field sensors is passed over a magnetically encoded scale body in non-contacting and spaced-apart relationship therewith. The sensor head has contained therein (at least) two magnetic field sensors which measure either the component of the magnetic field vector in the direction of their sensitivity or the angle of the magnetic vector field relative to the direction of motion. Counting magnetic periods provides information as to the distance traveled.

Generally, the magnetic field sensors are arranged in the sensor head at a distance of one quarter or three quarters of a magnetic field period from each other. This results in a 90° (or 270°) phase difference. The corresponding magnetic field sensors are commonly called sine sensor and cosine sensor. See also the book cited above.

Correspondingly, an incremental displacement system comprising a magnetically encoded scale body provides up to two output signals which are a position (displacement increments) and a reference signal. A coefficient can be determined for both signals and a combination of the two values can be transmitted.

A position signal is derived for example by interpolating the sensor signals from the sine sensor and the cosine sensor. The amplitude decreases under the effect of different influencing quantities, such as distance from the magnetically encoded scale body, lateral offset, temperature, etc. The coefficient can be determined from the amplitude or the phase.

For a reference pulse (reference signal), same is determined from two magnetic sensors. These magnetic sensors are separated by a defined distance. A change in angle causes the phase between the magnetic sensors to change. Evaluation becomes more critical. The reference signal is also angle-dependent. Via the usable signals in accordance with FIGS. 6(a) and (b), the corresponding reference signal in accordance with FIG. 6(c) can be captured, with the above mentioned possibility of coefficient capture.

In principle, with appropriate construction a magnetically encoded displacement measuring system is also able to determine an absolute position. In particular, a plurality of magnetic sensors exist. For example, if the sensor head is twisted relative to the scale body, the mechanical conditions change and the absolute position determination becomes more critical. Temperature, distance, lateral offset, etc. have an influence as well. Here again, the coefficient can be derived from the corresponding signals of the magnetic field sensors and reference is made to what has been said in connection with FIG. 6.

In an exemplary embodiment, magnetic fields of a scale body are measured with the aid of a plurality of sensors (for example 2*15 sensors). When a sensor unit having these sensors is moved, the magnetic fields that can be seen by the sensors change. When a magnetic field change occurs, the corresponding sensor that sees this change in magnetic field must switch. The switching of the sensors should occur as simultaneously as possible and also, where possible, at the center of a range in which the switching of a sensor is acceptable. The simultaneity and the centrality of the switching of the sensors in a corresponding sensor unit are a measure of the quality of the (primary) measurement signal.

If a sensor head having such a sensor unit has too large a distance relative to the scale body or is in an incorrect position or orientation relative to the scale body, the centrality or simultaneity decreases and signal generation becomes more critical.

The coefficient for centrality and simultaneity can be determined by the method described above.

In accordance with the invention, a measurement signal is provided which contains a primary measurement value signal that contains the measurement values. The measurement signal further comprises a coefficient signal which characterizes the capture of the measurement values and in particular the security or margin thereof.

In an exemplary embodiment, coefficient signals are attached to or are superimposed on the primary measurement value signals. This results in a corresponding signal train.

With appropriate configuration of this signal, a decision can be made by a superordinate controller as to whether or not the coefficient signal is utilized.

The coefficient signal can be evaluated by a corresponding diagnostic tool in the control device 28. Optionally, it is possible for the sensor device 12 to be adjusted when, for example, the coefficient is or becomes too low.

For example, it is also possible for the coefficient to change in certain positions or measurement ranges. Such a change may occur in operation (for example following a crash or after servicing) when relevant properties such as an air gap change. By determining the coefficient on a regular basis, such effects can be diagnosed at an early stage and corresponding actions can be initiated.

In principle, coefficients can be advantageously captured and transmitted in sensor systems that are employed for displacement and distance measurements. However, coefficient capture and transmission is in principle possible in any sensor system.

LIST OF REFERENCE NUMBERS

10 sensor system
12 sensor device 14 output
16 sensor unit
18 housing
20 transducer unit
22 coefficient determining unit
24 amplifier
26 interface
28 control device
30 interface
32 evaluation unit
34 first terminal
36 second terminal
38 line
40 coefficient signal
42 measurement value signal
44 measurement value data bit
46 error bit
48 warning bit
50 clock impulse
52 data bit
54 datum
56 error bit
58 warning bit
60 start bit
62 CDS
64 CRC across data bits
66 datum
68 CRC across data bits, CRC of the data bits and coefficient
70 signal
72 signal
74 increment signal
76 analog signal
78a zero-crossing
78b zero-crossing
80 zero-crossing
82 HIGH
84 edge
86 signal
88 critical signal form of U2($s$) as U2a($s$)
88' critical signal form of U2($s$) as U2b($s$)
88" critical signal form of U2($s$) as U2c($s$)

The invention claimed is:

1. Method for operating a sensor system, comprising:
providing signals output via at least one sensor unit, the signals comprising:
primary measurement value signals which are measurement values of the sensor unit or are generated from measurement values of the sensor unit, and
separate coefficient signals which characterize a measurement value capture of the measurement values,
wherein:
coefficients which are contained in the coefficient signals characterize at least one of (i) what margin, (ii) what security and (iii) what quality exists in the measurement value capture, and
the coefficient signals are transmitted at a data rate that is less than a data rate of the measurement value signals.

2. Method in accordance with claim 1, wherein the primary measurement value signals are electrical signals which are measurement values of, or are generated from, one or more physical quantities.

3. Method in accordance with claim 1, wherein the primary measurement value signals and the coefficient signals are transmitted on different channels.

4. Method in accordance with claim 1, wherein the primary measurement value signals and the coefficient signals are transmitted in attached relationship with each other.

5. Method in accordance with claim 1, wherein the coefficient signals are permanently transmitted.

6. Method in accordance with claim 1, wherein the coefficient signals and the primary measurement value signals are transmitted in analog form.

7. Method in accordance with claim 1, wherein the primary measurement value signals and the coefficient signals are transmitted in serial digital form.

8. Method in accordance with claim 7, wherein the primary measurement value signals are transmitted as digital datum comprising a plurality of data bits.

9. Method in accordance with claim 8, wherein a number of the data bits requested and output is defined by clock impulses of a controller.

10. Method in accordance with claim 8, wherein at least one of the datum of the measurement value signals and datum of the coefficient signals comprises one or more extra bits.

11. Method in accordance with claim 10, wherein:
the measurement value signal datum is provided with CRC bits, and
CRC bits are attached to the coefficient signal datum.

12. Method in accordance with claim 11, wherein a number of clock periods for the measurement value signals with n data bits with attached coefficient signals with m data bits and with q data bits for a CRC datum is n+m+2q.

13. Method in accordance with claim 7, wherein one of the coefficient signals is attached to datum of an associated one of the primary measurement value signals as a digital datum comprising data bits.

14. Method in accordance with claim 13, wherein a number of associated clock periods of the primary measurement value signal with n data bits with the attached coefficient signal with m data bits is n+m.

15. Method in accordance with claim 7, wherein the primary measurement value signals and the coefficient signals are transmitted according to SSI interface or BiSS-C interface.

16. Method in accordance with claim 1, wherein the primary measurement value signals are transmitted as analog or digital increments.

17. Method in accordance with claim 16, wherein the coefficient signals are transmitted as increments with a time distance apart that is less than a time distance between increments of the primary measurement value signals.

18. Method in accordance with claim 1, wherein transmission of the coefficient signals is such that a superordinate controller can decide whether or not it evaluates the coefficient signals.

19. Method in accordance with claim 1, wherein a signal chain comprising the primary measurement value signals and the coefficient signals is formed such that there is provided a capability of selecting whether or not coefficients are read out.

20. Method in accordance with claim 1, wherein the coefficient signals are determined at the sensor system without the use of additional monitoring sensors.

21. Method in accordance with claim 1, wherein in a sensor system in which a time period between certain two zero-crossings is measured as one of the primary measurement value signals, a maximum signal level between the zero-crossings results in a coefficient of one of the coefficient signals.

22. Method in accordance with claim 1, wherein the measurement values are captured from a plurality of signals of the at least one sensor unit.

23. Method in accordance with claim 22, wherein a check is performed as to whether on a certain zero-crossing of an analog first sensor signal, a digital second signal is in a high state and if so, a measurement signal is generated.

24. Method in accordance with claim 23, wherein one of the coefficient signals is generated from a length of the second sensor signal at HIGH and a position thereof relative to the zero-crossing.

25. Method in accordance with claim 1, wherein in a magnetostrictive displacement measuring system, a position value is derived from a voltage signal and an amplitude of the voltage signal forms a coefficient signal.

26. Method in accordance with claim 1, wherein in a magnetically encoded displacement measuring system, a coefficient signal is determined from at least one of (i) an amplitude or amplitude ratio of magnetic sensor signals and (ii) a phase or phase ratio of magnetic sensor signals.

27. Method in accordance with claim 1, wherein in a sensor system comprising a plurality of sensor units, the measurement value of the sensor unit that has a highest coefficient is used.

28. Sensor system, comprising:
at least one sensor unit which provides measurement values for primary measurement value signals, and
a coefficient determining unit which generates separate coefficient signals that characterize a measurement value capture of the measurement values,
wherein:
coefficients which are contained in the coefficient signals characterize at least one of (i) what margin, (ii) what security and (iii) what quality exists in the measurement value capture;
the primary measurement value signals and the separate coefficient signals are output from the system; and
the coefficient signals are transmitted at a data rate that is less than a data rate of the measurement value signals.

29. Sensor system in accordance with claim 28, wherein a signal generating unit is provided which connects the coefficient signals to the primary measurement value signals.

30. Sensor system in accordance with claim 28, wherein the coefficient determining unit generates the coefficient signals without use of additional monitoring sensors.

31. Measurement signal of a sensor system, comprising:
a primary measurement value signal, and
a coefficient signal which characterizes a measurement value capture of measurement values,
wherein:
coefficients which are contained in the coefficient signal characterize at least one of (i) what margin, (ii) what security and (iii) what quality exists in the measurement value capture, and
the coefficient signal is transmitted at a data rate that is less than a data rate of the measurement value signal.

32. Measurement signal in accordance with claim 31, wherein the primary measurement value signal is a digital serial signal and the coefficient signal is attached as a digital datum to the primary measurement value signal.

33. Method for operating a sensor system, comprising:
providing signals output via at least one sensor unit, the signals comprising:
primary measurement value signals which are measurement values of the sensor unit or are generated from measurement values of the sensor unit, and
separate coefficient signals which characterize a measurement value capture of the measurement values,
wherein:
coefficients which are contained in the coefficient signals characterize at least one of (i) what margin, (ii) what security and (iii) what quality exists in the measurement value capture,
the primary measurement value signals and the coefficient signals are transmitted in serial digital form,
the primary measurement value signals are transmitted as digital datum comprising a plurality of data bits, and
a number of the data bits requested and output is defined by clock impulses of a controller.

34. Method for operating a sensor system, comprising:
providing signals output via at least one sensor unit, the signals comprising:
primary measurement value signals which are measurement values of the sensor unit or are generated from measurement values of the sensor unit, and
separate coefficient signals which characterize a measurement value capture of the measurement values,
wherein:
coefficients which are contained in the coefficient signals characterize at least one of (i) what margin, (ii) what security and (iii) what quality exists in the measurement value capture,
the primary measurement value signals and the coefficient signals are transmitted in serial digital form, and
one of the coefficient signals is attached to datum of an associated one of the primary measurement value signals as a digital datum comprising data bits.

35. Method for operating a sensor system, comprising:
providing signals output via at least one sensor unit, the signals comprising:
primary measurement value signals which are measurement values of the sensor unit or are generated from measurement values of the sensor unit, and
separate coefficient signals which characterize a measurement value capture of the measurement values,
wherein:
coefficients which are contained in the coefficient signals characterize at least one of (i) what margin, (ii) what security and (iii) what quality exists in the measurement value capture,
the primary measurement value signals and the coefficient signals are transmitted in serial digital form,
the primary measurement value signals are transmitted as digital datum comprising a plurality of data bits, and
at least one of the datum of the measurement value signals and datum of the coefficient signals comprises one or more extra bits.

36. Method for operating a sensor system, comprising:
providing signals output via at least one sensor unit, the signals comprising:
primary measurement value signals which are measurement values of the sensor unit or are generated from measurement values of the sensor unit, and
separate coefficient signals which characterize a measurement value capture of the measurement values,
wherein:
coefficients which are contained in the coefficient signals characterize at least one of (i) what margin, (ii) what security and (iii) what quality exists in the measurement value capture,
the primary measurement value signals and the coefficient signals are transmitted in serial digital form, and the primary measurement value signals and the coefficient signals are transmitted according to SSI interface or BiSS-C interface.

37. Method for operating a sensor system, comprising:

providing signals output via at least one sensor unit, the signals comprising:

primary measurement value signals which are measurement values of the sensor unit or are generated from measurement values of the sensor unit, and separate coefficient signals which characterize a measurement value capture of the measurement values, wherein:

coefficients which are contained in the coefficient signals characterize at least one of (i) what margin, (ii) what security and (iii) what quality exists in the measurement value capture, the measurement values are captured from a plurality of signals of the at least one sensor unit, and a check is performed as to whether on a certain zero-crossing of an analog first sensor signal, a digital second signal is in a high state and if so, a measurement signal is generated.

38. Method for operating a sensor system, comprising:

providing signals output via at least one sensor unit, the signals comprising:

primary measurement value signals which are measurement values of the sensor unit or are generated from measurement values of the sensor unit, and separate coefficient signals which characterize a measurement value capture of the measurement values, wherein:

coefficients which are contained in the coefficient signals characterize at least one of (i) what margin, (ii) what security and (iii) what quality exists in the measurement value capture, and in a sensor system comprising a plurality of sensor units, the measurement value of the sensor unit that has a highest coefficient is used.

* * * * *